United States Patent
Andreatta et al.

(10) Patent No.: US 9,372,734 B2
(45) Date of Patent: Jun. 21, 2016

(54) OUTAGE WINDOW SCHEDULER TOOL

(71) Applicant: Bank of America Corporation, Charlotte, NC (US)

(72) Inventors: Richard Gerard Andreatta, Jacksonville, FL (US); David Joseph Madigan, Indian Trail, NC (US)

(73) Assignee: Bank of America Corporation, Charlotte, NC (US)

( * ) Notice: Subject to any disclaimer, the term of this patent is extended or adjusted under 35 U.S.C. 154(b) by 252 days.

(21) Appl. No.: 14/011,472

(22) Filed: Aug. 27, 2013

(65) Prior Publication Data

US 2015/0066813 A1 Mar. 5, 2015

(51) Int. Cl.
*G06F 17/00* (2006.01)
*G06F 17/20* (2006.01)
*G06F 9/50* (2006.01)

(52) U.S. Cl.
CPC ........ *G06F 9/505* (2013.01); *G06F 2209/5019* (2013.01)

(58) Field of Classification Search
USPC .......................................................... 706/11
See application file for complete search history.

(56) References Cited

U.S. PATENT DOCUMENTS

| | | |
|---|---|---|
| 6,978,398 B2 | 12/2005 | Harper |
| 7,024,580 B2 | 4/2006 | Guimbellot |
| 7,149,917 B2 | 12/2006 | Huang |
| 7,158,926 B2 | 1/2007 | Kampe |
| 7,343,310 B1 * | 3/2008 | Stender ............................ 705/4 |
| 7,375,649 B2 * | 5/2008 | Gueziec ............ G01C 21/3492 340/905 |
| 7,441,154 B2 | 10/2008 | Klotz |
| 7,508,321 B2 * | 3/2009 | Gueziec ............ G01C 21/3492 340/905 |
| 7,557,730 B2 * | 7/2009 | Gueziec ............ G01C 21/3492 340/905 |
| 7,873,505 B2 | 1/2011 | Bauer |
| 7,880,642 B2 * | 2/2011 | Gueziec ............ G01C 21/3492 340/905 |
| 7,958,507 B2 | 6/2011 | Santos |
| 8,181,071 B2 | 5/2012 | Cahill |
| 8,212,683 B2 | 7/2012 | Klein |
| 8,341,617 B2 | 12/2012 | Bunn |
| 8,358,222 B2 * | 1/2013 | Gueziec ............ G01C 21/3492 340/905 |
| 8,494,911 B2 | 7/2013 | White |

(Continued)

OTHER PUBLICATIONS

Greenbiz "Most Servers in Data Centers Vastly Underutilized." downloaded from: http://www.greenbiz.com/news/2010/07/09/most-servers-vastly-underutilized, on: Jun. 24, 2015 11:03:46 AM.*

(Continued)

*Primary Examiner* — Michael B Holmes
(74) *Attorney, Agent, or Firm* — Banner & Witcoff, Ltd.; Michael A. Springs

(57) ABSTRACT

An apparatus for determining a future outage window in which to perform work on a server may include an input for receiving historical performance data about at least one server, a non-transitory memory and a processor communicatively coupled to the input and the memory. The processor may be configured to use instructions stored in the memory to predict one or more likely future time windows to be recommended as possible outage windows in which to perform work on the server. The processor may analyze historical performance data about the at least one server to determine one or more historical time windows corresponding to low CPU utilization of the at least one server. In some cases, the processor may then predict one or more future time windows to be recommended for use as the outage window using, at least in part, the determined historical time windows.

18 Claims, 6 Drawing Sheets

(56) References Cited

U.S. PATENT DOCUMENTS

| | | | |
|---|---|---|---|
| 8,521,706 B2 | 8/2013 | Alpern | |
| 8,531,312 B2* | 9/2013 | Gueziec | G01C 21/3492 340/905 |
| 8,537,033 B2* | 9/2013 | Gueziec | G01C 21/3492 340/905 |
| 8,564,455 B2* | 10/2013 | Gueziec | G01C 21/3492 340/905 |
| 8,682,699 B2* | 3/2014 | Collins | G06Q 40/08 705/4 |
| 8,786,464 B2* | 7/2014 | Gueziec | G01C 21/3492 340/904 |
| 8,958,988 B2* | 2/2015 | Gueziec | G01C 21/3492 701/117 |
| 9,070,291 B2* | 6/2015 | Gueziec | G01C 21/3492 |
| 9,082,303 B2* | 7/2015 | Gueziec | G01C 21/3492 |
| 2002/0002578 A1 | 1/2002 | Yamashita | |
| 2003/0023719 A1* | 1/2003 | Castelli et al. | 709/224 |
| 2003/0187967 A1 | 10/2003 | Walsh | |
| 2006/0149985 A1* | 7/2006 | Dubinsky | 713/324 |
| 2008/0046559 A1* | 2/2008 | Langer | G06F 11/0748 709/224 |
| 2008/0059277 A1 | 3/2008 | Medina | |
| 2009/0144112 A1 | 6/2009 | Eschenroeder | |
| 2010/0043004 A1 | 2/2010 | Tambi | |
| 2010/0251247 A1 | 9/2010 | Pedersen | |
| 2011/0119604 A1 | 5/2011 | Lo | |
| 2012/0110460 A1* | 5/2012 | Wilson | 715/736 |
| 2012/0254395 A1 | 10/2012 | Bonas | |

OTHER PUBLICATIONS

Traffic Flow Prediction for Road Transportation Networks With Limited Traffic Data A. Abadi; T. Rajabioun; P. A. Ioannou IEEE Transactions on Intelligent Transportation Systems Year: 2015, vol. 16, Issue: 2 pp. 653-662, DOI: 10.1109/TITS.2014.2337238 IEEE Journals & Magazines.*

An online learning framework for predicting the taxi stand's profitability L. Moreira-Matias; J. M. endes-Moreira; M. Ferreira; J. Gama; L. Damas Intelligent Transportation Systems (ITSC), 2014 IEEE 17th International Conference on Year: 2014 pp. 2009-2014, DOI: 10.1109/ITSC.2014.6957999 IEEE Conference Publications.*

Online Traffic Prediction in the Cloud: A Dynamic Window Approach B. L. Dalmazo; J. P. Vilela; M. Curado Future Internet of Things and Cloud (FiCloud), 2014 International Conference on Year: 2014 pp. 9-14, DOI: 10.1109/FiCloud.2014.12 IEEE Conference Publications.*

Predictive tree: An efficient index for predictive queries on road networks A. M. Hendawi; J. Bao; M. F. Mokbel; M. Ali Data Engineering (ICDE), 2015 IEEE 31st International Conference on Year: 2015 pp. 1215-1226, DOI: 10.1109/ICDE.2015.7113369 IEEE Conference Publications.*

* cited by examiner

OUTAGE WINDOW SCHEDULER TOOL

BACKGROUND

Maintenance and/or upgrade activities on computer systems are ideally performed when the computer systems are under-utilized. In some computer systems, it may be assumed that certain periods of time will have a relatively low impact on a computer system, such as during the night, and so such activities may be scheduled for predictable low-use periods. In other computer systems, such a predictable or regular usage schedule may not exist. In these cases, educated guesswork by humans may be used to determine a future window of time in which to schedule the activity. Unfortunately, such guesswork is too often wrong, and the resulting impact on a computer system during high utilization can result in an inconvenience or worse for users of the computer system.

SUMMARY

The following summary is for illustrative purposes only, and is not intended to limit or constrain the detailed description.

It may be desirable to be able to determine future windows of time for maintenance, upgrades, and/or other computer system work in a more reliable way. As will be described by way of example herein, an outage window scheduler tool may be provided that may automatically or semi-automatically determine such future windows of time for a computer system based on known predetermined information such as scheduled utilization and/or historical utilization of the computer system. Statistical analysis, for example, may be used on the information to make such determinations. Such a tool may efficiently and effectively assist organizations in finding schedule periods for server maintenance, system transformation, and/or other activities. The outage window scheduler tool may potentially save time and money by taking the guess work out of planned maintenance scheduling. For example, using a known amount of time for performing a given activity, the outage window scheduler may determine and indicate to a user one or more future windows of opportunity that would be appropriate for performing the activity.

According to some aspects, an apparatus for determining a future outage window in which to perform work on at least one server may include an input for receiving historical performance data about at least one server, a non-transitory memory and a processor communicatively coupled to the input and the memory. The processor may be configured to use instructions stored in the memory to predict one or more likely future time windows to be recommended as possible outage windows in which to perform work on the at least one server. The processor may analyze historical performance data about the at least one server to determine one or more historical time windows corresponding to low processor (e.g., CPU) utilization of the at least one server. In some cases, the processor may then predict one or more future time windows to be recommended for use as the outage window using, at least in part, the determined historical time windows.

In some cases, a system for scheduling one or more future time windows for performing work on one or more servers may include a first memory unit for storing a database that includes operational information about one or more servers (which may be, e.g., coupled together on a network) and a scheduler coupled to the database. The database may include, among other information, historical processor utilization information associated with the operation of each of the one or more servers. In some cases, the scheduler may include a second memory unit and a processor, wherein the second memory unit is configured to store computer-readable instructions that, when executed by the processor, cause the processor to determine one or more likely future time windows that may be recommended as possible outage windows in which to perform work on the server. For example, the instructions may cause the processor to analyze the historical processor utilization information associated with the one or more servers received from the database and determine the one or more future time windows. The processor may determine a confidence level (e.g., a ranking or a risk tier) associated with each of the one or more future time windows, wherein each confidence level corresponds to a risk with performing the work during the associated duration and present to a user one or more of the predicted future time windows based, at least in part, on the ranking associated with the one or more future time windows.

In some cases, an illustrative technique for scheduling downtime (e.g., an outage window) for one or more servers (which may be, e.g., coupled together on a network) may include receiving historical performance data about the server, the historical performance data including processor utilization information, predicting one or more predicted future time windows as likely candidates for the future outage window in which to perform work on the one or more servers, and recommending to a user at least one of the predicted future time windows as the future outage window for performing maintenance on the one or more servers.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
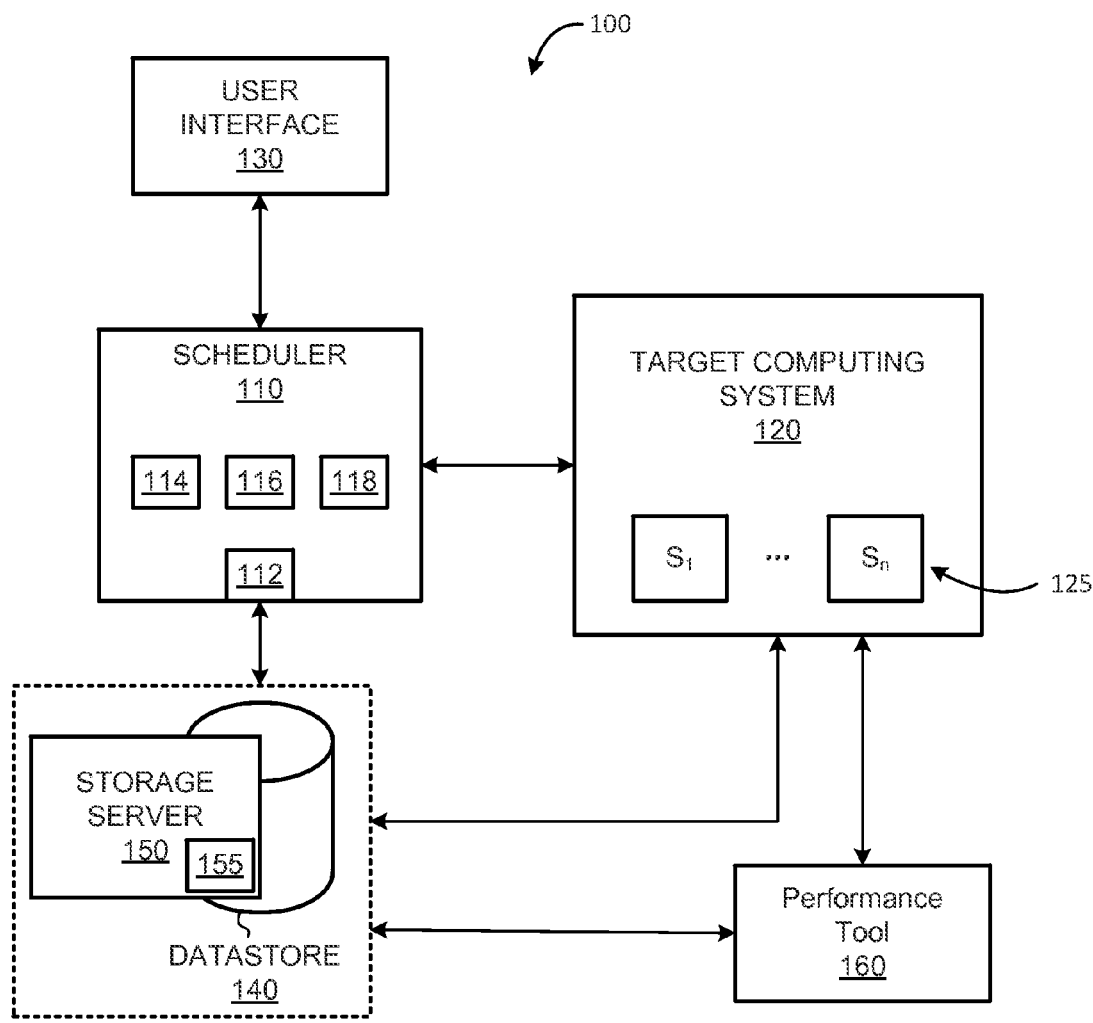
FIG. 1 is a block diagram of an illustrative computing environment in which one or more aspects as described herein may be practiced.

FIG. 1 is a block diagram of an illustrative computing environment 100 in which one or more aspects as described herein may be practiced. In the example shown, the illustrative computing environment 100 may include a scheduler 110, a target computing system 120 that may include one or more servers $S_1$-$S_N$ (collectively referred to as servers 125), a user interface 130, a data store 140 that may be located on and/or utilized by a storage server 150, and a performance tool 160 for monitoring the operation of the target computer system 120. While the storage server 150 is shown as a separate element, the storage server and/or the data store 140 may be physically separate elements or they may be physically included as part of, e.g., the servers 125 of the target computing system 120, the performance tool 160, and/or the scheduler 110. The data store 140 may include one or more computer-readable storage media, such as but not limited to one or more hard drives, tape drives, optical drives, and/or memory chips. The one or more computer-readable media may be non-transitory and may be all co-located in a single place or distributed amongst multiple difference locations.

Often, organizations may utilize computing networks when conducting business or other activities. An illustrative computing network, such as the target computing system 120, may include one or more servers 125 to facilitate the business operations of the organization. In some cases, for example, a computer network may be quite large and include hundreds, if not thousands, of individual servers and/or one or more server instances running on a common server. At various times, the organizations may desire to perform maintenance or other activities on the one or more servers 125. The scheduler 110 may be used, for example, to efficiently and effectively assist organizations in finding one or more time windows (e.g., times of minimal impact) in which to schedule server maintenance or transformations that may include upgrades to software (e.g., applications, drivers, software modules, and the like) used on the server, upgrades to one or more hardware components of the server, server migration to a new platform, and the like. By doing so, the scheduler 110 may potentially allow an organization to save time and/or money by taking the guess work out of maintenance scheduling. The scheduler 110 may be configured, for example, to consider an amount of time needed to perform a maintenance function or other work and present one or more future time windows in which the work is recommended to be performed on one or more of the servers 125. The recommended future time windows may be those time windows predicted to allow the work to be performed with reduced or even minimal impact to the server network (e.g., the target computing system). To perform such predictions, the scheduler 110 may be configured, for example, to import current and/or historical operational information about the servers 125, such as from the data store 140. In some cases, the historical operational information stored within the data store 140 may have a particular format, however this is not necessary. For example, the scheduler 110, or an associated application, may be used to extract data having any format from the data store 140.

If desired, the extracted data may be converted into a format useful to the scheduler 110. By doing so, any performance monitoring tool may be used to provide the current and/or historical network performance data to the scheduler 110. The scheduler 110 may apply several iterations of one or more algorithms (e.g., using statistical methods) to determine one or more future time windows. These future time windows may correspond, for instance, to durations of predicted future consecutive "slack" periods of utilization of processors of the one or more servers 125 on which the work is to be performed. These predicted consecutive slack periods (CSPs) may correspond to an aggregated amount time of processor "slack", or very low processor utilization that is predicted to be less than a predetermined utilization threshold (e.g., less than 2% utilization, less than 4% utilization, less than 5% utilization, or less than 10% utilization). The scheduler 110 may then apply a graduated ranking system (e.g., assigns a confidence level) to each of the one or more future time windows to indicate the likelihood of whether a particular future time window will actually correspond to a future CSP. These future time windows, and the associated confidence levels, may then be presented to a user, such as via the user interface 130, thus giving the users the ability to strategically choose when to schedule an outage window in which to perform the desired maintenance and to efficiently manage their server environments.

Such maintenance may often be desired to be performed during times of minimal activity on the computing network to minimally impact users and/or business operations. Sometimes the maintenance can be planned well in advance. In such cases, the maintenance can be announced to users so that a shutdown of one or more tasks and/or devices (e.g., one or more of the servers 125) can be anticipated. Often, however, maintenance must be performed "on the fly" with minimal impact to the business operations. In other cases, it may not be feasible to request a change to the normal operation of the servers 125 to allow for the maintenance; rather, the maintenance should be squeezed in whenever it is believed that there will be a reasonably low impact to the servers 125. To do so, such maintenance activities are usually scheduled during expected times of minimal activity on the network. For example, when the servers 125 are accessed locally (e.g., by users and devices in a time zone associated with the geographical location of the server), determining a time (e.g., overnight, on a weekend, or over a holiday) when to schedule an outage window for a particular server 126 may be relatively straightforward.

Many organizations, however, have business operations that may span multiple time zones and/or geographical locations. This, in turn, may often result in increasingly complex computing networks being used by these organizations. For example, the servers 125 may be distributed over a larger geographical area (e.g., in different time zones) and/or a server may be accessed by one or more users and/or devices located outside the local time zone of the particular server. As such, the complexity of determining times (e.g., an outage window) when maintenance may be performed on a particular server has become increasingly difficult. To facilitate scheduling server maintenance in such computing networks, the scheduler 110 (e.g., an outage window scheduler tool), may be used to predict and/or recommend one or more likely future time windows. These future time windows may be selected (e.g., by a user and/or automatically) for use as the outage window in which to perform the server maintenance. In some cases, the scheduler 110 may consider an amount of time necessary to perform a desired maintenance function when predicting the future time windows in which to perform that particular maintenance function. As multiple maintenance events may be desired to be performed for a particular server 126, the scheduler 110 may use information about one or more previously scheduled outage windows when determining the one or more future time windows. For example, two or more maintenance events may be scheduled to be performed within the same outage window when the duration of the outage window meets and/or exceeds the duration of time expected to complete the different maintenance events. Conversely, a future time window may not be recommended as an outage window when at least a portion of the future time window corresponds to a previously scheduled outage window. Sometimes, an indication of one or more previously scheduled outage windows may be indicated to a user along with or instead of the one or more future time windows, such as by using a visual indication.

In the example of FIG. 1, the scheduler 110 may be configured for determining an outage window in which to perform work (e.g., a maintenance event) on one or more of the servers 125 within the target computing system 120. In general, the scheduler 110 may include, for example, one or more elements of the illustrative computing device 200 of FIG. 2 which will be discussed in greater detail below. For example, the scheduler may include at least one input 112, a processor 114, a memory 116, and/or one or more filters 118. In some cases, at least a portion of the data store 140 may be included within the memory 116, but this is not required. For example, the processor 114 may be configured to process instructions stored in the memory 116 to process an algorithm for predicting one or more future time windows that may be used as an outage window when performing maintenance on the server 126. For example, the algorithm may process information about the historical operation of the server 126 when determining predicting the one or more future time windows. In some cases, the scheduler 110 may receive the historical information at the input 112 via the communication link 152 from the data store 140. In some cases, the scheduler 110 may be capable of importing historical data related to the operation of one or more of the servers 125. In some cases, the scheduler 110 may be configured to import historical operational data corresponding to the operation of each of two or more servers 125.

As mentioned above, the scheduler 110 may use one or more statistical methods when determining the one or more future time windows. For example, the statistical methods may include, but not be limited to, using one or more regression techniques, one or more advanced statistical methods or a combination. For example, the regression techniques may include on or more of a linear regression, a partial and/or stepwise regression, a logit or probit regression, one or more regressions splines, and the like. In some cases, the statistical methods may include or one or more advanced techniques (e.g., nonlinear statistical modeling tools), such as by using a neural network, a classifier, a pattern recognition method (e.g., a nearest neighbor algorithm), a Support Vector Machine, a radial basis function, and/or other predictive modeling techniques. Of course, these predictive algorithms are merely meant to be illustrative and should not be considered limiting in any way. In some cases, the algorithms may be encoded in instructions stored in the memory 116 using one or more programming languages and/or one or more software applications.

Organizations may monitor the performance of the computing system 120 (e.g., the performance of both hardware and software running on the hardware) by monitoring network traffic, monitoring resource utilization, or both using a network monitoring tool (e.g., the performance tool 160). The performance tool 160 monitor the performance of one or more components (e.g., the servers 125) of the target computing system 120 and/or the quality of communications within the target computing system 120, such as between the servers 125. By monitoring the performance of the target computing system 120, the performance tool 160 collects information to form a historical record about the performance of the target computing system 120 in general and, more specifically, about the historical performance of the one or more servers 125. In some cases, the data store 140 may store historical and/or current information corresponding to server 125 operations including, for example, processor (e.g., CPU) utilization information, memory utilization information, free and/or utilized disk space information, disk access information, applications and/or application types used, communication protocol monitoring information, and the like. Typically, performance data, such as CPU utilization information, may be used to indicate when a server is at or is approaching a predetermined load that may correspond to a load level which may adversely affect the performance of the server and/or the system of the servers 125. The scheduler 110, on the other hand, may analyze the CPU utilization information to help predict one or more quiescent time windows (e.g., a time window of low CPU utilization) that may, in turn, be recommended as one or more potential outage windows. Further, because the performance tools monitor runtime information, the performance data may be captured synchronously (e.g., at a specified time interval) or asynchronously.

The performance tool 160 may be communicatively coupled to the data store 140 to store the collected performance data within at least a portion of the data store 140. For example, the data store 140 may include operational information corresponding to network communications and/or operational information corresponding to the operation of one or more computing devices communicating via the computing network that may be obtained, at least in part, by the performance tool 160. For example, the data store 140 may include information corresponding to the CPU utilization of each of the servers 125. Sometimes, information gathered by the performance tool 160 may be used for troubleshooting network problems (e.g., resource allocation, communication issues, and/or server overload conditions). The historical performance data may be gathered by capturing information about the performance of the different components (e.g., the servers 125, 126, and/or 150) of the target computing system 120, such as at regular time intervals (e.g., every 2 minutes, every 5 minutes, or every 10 minutes). Information gathered using the performance tool 160 may include one or more processor (e.g., CPU) utilization parameters (e.g., CPU user utilization, CPU utilization, I/O wait percentage, and/or idle percentage). The CPU user utilization parameter for a particular server 125 may be, for example, indicative of an amount (e.g., the number or percentage) of users currently utilizing one or more applications on the particular server 125. In other words, the CPU user utilization parameter for a given moment in time and/or for a given time window may be used to describe how active users may be on the server 126 during that moment in time and/or time window. For example, when a CPU user utilization parameter is less than (or less than or equal to) a particular predetermined threshold quantity (e.g., about 1%, about 2%, about 5%, about 10%, X number of users, and/or the like) may indicate that the server 125 may be experiencing a quiescent period corresponding to minimal user utilization. In some cases, the CPU user utilization parameter and/or one or more different CPU utilization parameters may be used.

In some cases, the historical performance data may include a baseline value for one or more of the processor utilization parameters discussed above, such as the CPU user utilization parameter, the CPU utilization parameter, the I/O wait percentage parameter, the idle percentage parameter, and the like. These baseline values may correspond to the baseline operation of the one or more servers 125 and may be stored in the data store 140 and/or may be computed using the historical performance information stored in the data store 140. For example, the baseline values may correspond to the operation of one or more tasks (e.g., applications) active on and/or accessing information on the server 126. In some cases, the baseline values may differ between different servers 125 due to a number of factors, including the age of the particular servers, a processor type, a memory type or amount, a number of applications active on the particular server. In some cases, the baseline utilization levels may be used by the scheduler when determining the one or more future time windows and/or when recommending which of the future time windows may be used as an outage window.

As discussed above, the scheduler 110 may use one or more predictive algorithms to analyze information about server operation over a specified duration (e.g., over the previous 14 days, over a duration between about the previous 14 days to about the previous 120 days, over a duration between about the previous 14 days to about the previous 180 days, and/or other durations of time such as a fixed-duration sliding window of time of any fixed or variable duration) when predicting the one or more future time windows. The processor 114 may determine one or more future time windows that may be recommended as possible outage windows in which to perform work (e.g., maintenance) on at least one of the servers 125 using the historical performance data obtained during the specified duration. In some cases, the historical performance data stored in the data store 140 may have a particular granularity. For example, the performance tool 160 may be configured to monitor the operational data at specified time intervals, such as every 5 minutes. In some cases, the scheduler 110 may be configured to aggregate the data (e.g., find a maximum value, find an average value, find a median value) within a different (e.g., larger) time interval, such as a 30 minute time interval, a 60 minute time interval, and the like. The aggregation of data into longer durations may allow the information read from the data store 140 to be more easily managed and/or analyzed when predicting the one or more future time windows.

In some cases, the processor 116 may be configured to determine a confidence level (e.g., a ranking and/or a risk tier) to be assigned to each of the one or more future time windows. For example, the confidence levels may correspond to a risk determined to be associated with using a particular future time window as the outage window for performing maintenance on the server 126. The confidence level may be assigned to each of the one or more future time windows. In some cases, the confidence level may correspond to whether the CPU utilization of the server 126 during a particular future time window will correspond to the CPU utilization of the same server 126 during one or more similar historical time windows. In some cases, the confidence level may be assigned to each of the one or more future time windows using an algorithm based, at least in part, on the CPU utilization information. For example, the confidence level may depend on whether the CPU utilization of the at least one server is less than or equal to a specified threshold during one or more similar historical time windows and/or whether a count of similar historical time windows where the CPU utilization of the server 126 was less than or equal to the specified threshold, or both.

In an illustrative example, the scheduler 110 may be written as a stand-alone software application or may be coded to run within another different application (e.g., a script and/or a macro). In some cases, the scheduler 110 may include a user interface (such as the user interface 130) to allow a user to determine the one or more future time windows for scheduling maintenance on the server 126. For example, the scheduler 110 may receive identification information about a server (e.g., a server name, an IP address, and the like) and access the data store 140 to access historical operational information (e.g., a CPU user percentage parameter) over a particular specified duration (e.g., 14 days, 15 days, a number of days between about 15 days to about 120 days, and/or other durations). The scheduler 110 may then process the historical operational information for the particular duration. In some cases, the scheduler 110 may process the information directly by aggregating, or otherwise grouping, the operational information into time segments different than the stored data. For example, the scheduler 110 may group the operational information into hour-long time segments, such as by finding a maximum CPU user percentage during the particular time segments. The scheduler 110 may further process the historical operational information by ordering the information and/or by finding any gaps in the historical operational information.

When processing the historical information, the scheduler 110 may find contiguous time windows where the maximum CPU user percentage was below one or more specified and/or predetermined thresholds (e.g., about 2%, about 4%, about 6%, about 8%, about 10%). The scheduler 110 may then count the same occurrence of beginning times from each of the contiguous time windows. The scheduler 110 may be configured to associate a confidence level to a particular contiguous time segment based on the determined count. For example, the confidence level may correspond to a utilization level (e.g., CPU user percentage) over a period of time. include a probability associated with a number of occurrences. For example, the scheduler 110 may associate confidence levels using a count of occurrences. For example a 60 percent confidence level may correspond to a count equaling 1, a 70 percent confidence level to a count equaling 2, an 80 percent confidence level to a count equaling 3, a ninety percent confidence level to a count equaling 4, and/or a ninety-five percent confidence level to a count equaling 5.

In an example, the scheduler 116 may provide a user with a reduced set of future time windows to be recommended as the outage window by, at least in part, filtering the prediction results (e.g., using one or more of the filters 118, which may be implemented, for example, as software instructions). In some cases, the filters 118 may include a "smart" filter for filtering the future time windows based on one or more factors. For example, the smart filter may reduce the number of future time windows presented to a user by filtering the results based on one or more of a selected time of day, day of the week, a window duration, a maximum number of events allowable on a day, and/or a maximum allowable confidence level (e.g., risk tier). For example, the confidence level may range from a risk tier associated with the highest risk (e.g., tier 5) and a risk tier associated with the lowest risk (e.g., tier 1). In some cases, these confidence levels may allow a user to deduce further information about the server. For example, if most, or all, predicted future time windows are designated as tier 5, the scheduler 110 may indicate to a user that the server may need to be analyzed as a candidate for resource allocation. For example, a user may configure the one or more filters to limit the number of presented future time windows by specifying that only future time windows having a confidence level within a specified subset of associated risk tiers are to be displayed. For example, the user may desire that only future time windows having confidence levels within the three lowest risk tiers are to be displayed (e.g., from tier 1 to tier 3), and/or for any other subcombination of the risk tiers (e.g, from tier 2 to tier 4, from tier 3 to tier 5, or only tier 1).

The scheduler 110 may be configured to filter a number of determined time windows using one or more different filters 118. For example, scheduler 110 may be configured to report one or more time windows having the greatest likelihood (e.g., highest confidence level) of occurrence. The user may desire to apply a filter corresponding to a desired day and/or time of day for scheduling an outage window. Additionally, the future time widows output (e.g., recommended) by the scheduler 110 may be filtered by removing one or more future time windows having a confidence level greater than a specified confidence level. In some cases, the scheduler 110 may filter the results by not reporting the same time future time window for different days.

In some cases, the "smart" filter may be used to eliminate some of the less desirable results when a large number of results are being produced. For example, the smart filter may reduce the result set of future time windows by presenting the results in a table representing recommended future time windows for each day of the week. The table may include a column associated with the server list (e.g., a server name column) and a column associated with each day of the week. Each of the weekday columns may be populated with an indication of one or more recommended time windows (e.g., including a start time, a duration and a confidence level) for the day, or an indication that no future time windows were predicted for that particular day (e.g., N/A). Further, the results may be filtered by limiting a number of future time windows to be displayed per day (e.g., 1, 2, 3, . . . ), by limiting a range of confidence levels (e.g., displaying the lowest available risk tiers), or both. For example, if a server has tier 1 (e.g., highest confidence) opportunities, a window having a tier 3 confidence level may be the last confidence level that shows up in the possibilities. For example, the smart filter may be configured to display future outage windows having a confidence level of tiers 1-3, tiers 2-4, and/or tiers 3-5. If a server finds a future outage window having a tier 1 confidence level, the filter may then filter out any future time windows having tier 4 or tier 5 confidence levels. Further, the smart filter may be configured to display different future time windows for each day of the week. For example, if a future time window is found to begin on Monday at 9 am, the smart filter may be configured to display future time windows having different start times for the rest of the days of the week. Of course, the scheduler may be configured to not use the filters 118 so that all possible future outage windows may be displayed.

Figure 2:
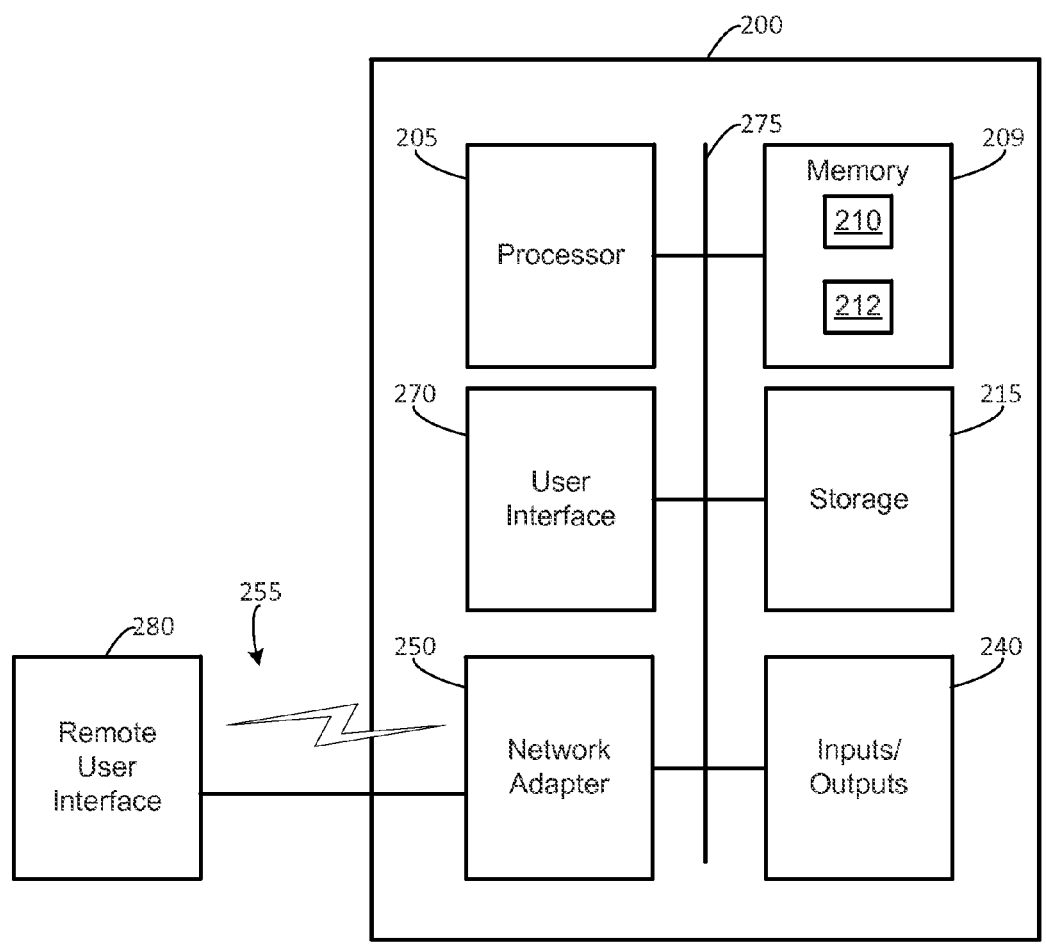
FIG. 2 is a block diagram of an illustrative computing device of which any of the elements of FIG. 1 may be composed.

FIG. 2 is a block diagram of an illustrative computing device of which any of the elements of FIG. 1 (e.g., the scheduler 110, each of the servers 125, the server 126, the storage server 150, and/or any of the other elements of FIG. 1) may be partially or fully composed. A computing device such as a computer 200 may house a variety of components for inputting, outputting, storing and processing data. The one or more components may be communicatively coupled using one or more data buses 275. For example, a processor 205 (e.g., the processor 114) may perform a variety of tasks including executing one or more applications, retrieving data from a storage device such as a storage unit 215 (e.g., the memory 116) and/or outputting data to a device such as display 220 (e.g., the user interface 150). The processor 205 may be connected to one or more memory units 209 that may include a Random Access Memory (RAM) module 210 in which application data and/or instructions may be temporarily stored. The RAM module 210 may be stored and accessed in any order, providing equal accessibility to the storage locations in the RAM module 210. The computer 200 may further include a Read Only Memory (ROM) 212 which allows data stored thereon to persist or survive after the computer 200 has been turned off. The ROM 212 may be used for a variety of purposes including for storage of the computer 200's Basic Input/Output System (BIOS). The ROM 212 may further store date and time information so that the information persists even through shut downs and reboots. In addition, the storage unit 215 may provide long term storage for a variety of data including applications and data files. The storage unit 115 may include any of a variety of computer readable mediums such as disc drives, optical storage mediums, magnetic tape storage systems, flash memory and the like. In one example, the processor 205 may retrieve an application or other computer-executable instructions from storage 215 and temporarily store the instructions associated with the application RAM module 210 while the application is executing. Each of the elements of FIG. 1 may be embodied as a computing device (such as computer 200) and/or as computer-executable instructions executed by a computing device.

The computer 200 may include the inputs/outputs 240 for receiving information and/or for outputting information. For example, the outputs may be configured to output data through a variety of components and devices. As mentioned above, one such output device may be or otherwise include a display, such as the user interface 130. Another output device may include an audio output device such as a speaker. Each output device may be associated with an output adapter such as a display adapter and the audio adapter, which translates processor instructions into corresponding audio and video signals. In addition to output systems, the computer 200 may receive and/or accept input from a variety of input devices such as a keyboard, a storage media drive and/or a microphone. As with the output devices, each of the input devices may be associated with an adapter for converting the input into computer readable/recognizable data and/or converting the output into one or more recognizable data formats used by an output device. In one example, voice input received through the microphone (not shown) may be converted into a digital format and stored in a data file. In another example, data input may be received through one or more devices, such as a card reader (not shown) and converted into a digital format. In one or more instances, a device such as a media drive may be coupled to one or more inputs and/or outputs of the adapter 240 act as both an input and output device allowing users to both write and read data to and from the storage media (e.g., DVD-R, CD-RW, a flash memory drive, a memory card, and the like). In some cases, one or more of the input devices and/or the output devices may be integrated into a common housing, such as the user interface 270. The user interface 270 may include a graphical user interface capable of displaying text and/or graphics for presenting information to a user. In some cases, the user interface 270 may include one or more input device, such as switches, buttons, keyboards, and the like. In some cases, the user interface 270 may a cathode ray tube (CRT) display, and LCD display, or a touchscreen display.

The computer 200 may further include one or more communication components for receiving and transmitting data over a network. Various types of wired and/or wireless networks 255 include cellular networks, digital broadcast networks, Internet Protocol (IP) networks and the like. The computer 200 may include adapters suited to communicate through one or more of these networks 255. In particular, the computer 200 may include a network adapter 250 for communication with one or more other computer or computing devices over a wired or wireless IP network. In one example, the network adapter 250 may facilitate transmission and/or receipt of data such as electronic mail messages, network analysis messages, performance data, and/or financial data over a company or organization's network. In another example, the network adapter 250 may facilitate transmission and/or receipt of information to/from a world-wide network such as the Internet. For example, a remote user interface 280 (which may be software and/or may itself be a computer such as computing device 200) may be communicatively coupled to the computer 200 via the one or more networks 255. The network adapter 250 may include or execute one or more sets of instructions relating to one or more networking protocols. For example, the adapter 250 may include a first set of instructions for processing IP network packets as well as a second set of instructions associated with processing cellular network packets. In one or more arrangements, the network adapter 250 may provide wireless network access for the computer 200.

Many computing devices such as the computer 200 may include a variety of other components and is not limited to the devices and systems described in FIG. 2.

Figure 3:
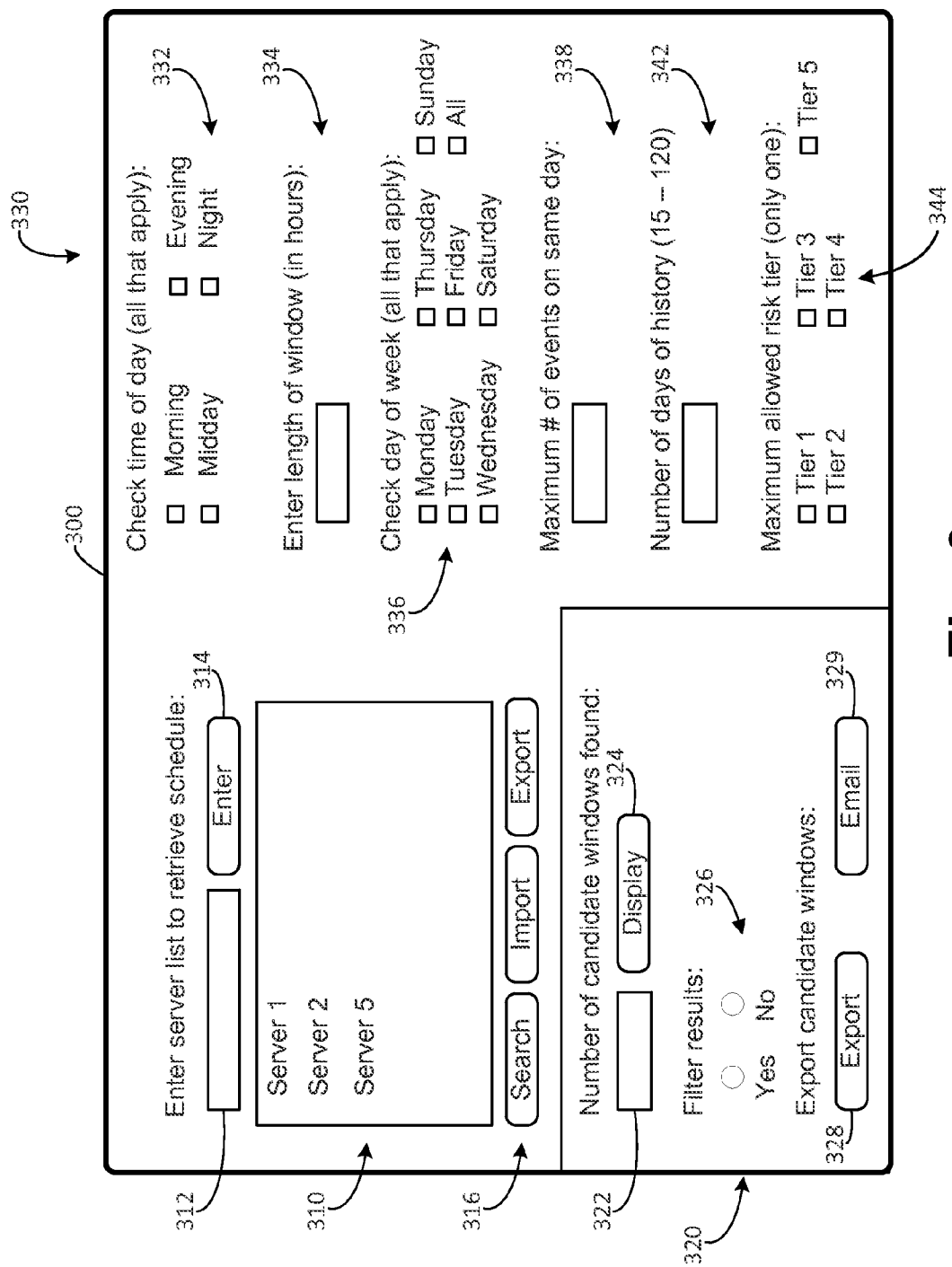
FIG. 3 shows an illustrative graphical user interface screen for facilitating determination of one or more future outage windows according to one or more aspects as described herein, and that may be used, for example, to perform work on one or more servers.

FIG. 3 shows an illustrative user interface screen 300 that may be displayed on, for example, the user interface 130 for facilitating the determination of one or more future outage windows that may be used to perform work on a server according to one or more aspects as described herein. The user interface screen may, for example, be a graphical user interface and/or a textual user interface, and may provide a user the ability to enter information about one or more servers 125 and to provide information to the scheduler that may limit, or otherwise format, the resulting future time windows predicted by the scheduler 110. The user interface screen 300 (as well as the user interface screens 400 and 500 described later in this document) may be generated by, for example, the user interface 130 and/or the scheduler 110.

The user interface screen 300 may include one or more sections for entering, importing, and/or exporting a list of servers. This list of servers may be used by the scheduler 110 for determining the one or more future time windows that may be used as an outage window for the one or more servers. For example, a user may enter identification information, such as a server name and/or a server IP address into the field 312 and accepted by clicking, or otherwise selecting, the enter button 314. The entered server identification information may then be displayed in the field 310. This information may be displayed as a list, as a tree, graphically, and/or the like. In some cases, a user may desire to delete, rename, or otherwise edit one or more of the server IDs. In such cases, the user may select a displayed server name, or the user may click an edit button (not shown) to directly edit the identification information such as via a keyboard. In some cases, the user may edit the user identification information via another dialog window (not shown). In some cases, the user interface screen 300 may include buttons 316 for searching for one or more servers on a connected computer network, for importing a predetermined list of servers (e.g., a text list or a comma-separated list), and/or for exporting the list shown in field 310. In some cases, one or more of the buttons 316 may open a separate dialog window (not shown) to facilitate the desired action. For example, by selecting the search button, the user interface 130 may display a window showing a tree view of a connected computer network, such as showing at least a subset of the servers 125 of the target computer system 120. By selecting the import button, the user interface may display a search dialog for searching for a particular file to be opened. A selection of the export button may prompt a user to specify at least a portion of the server list in the field 310 to be exported to a file, and to prompt the user to specify a desired file format (e.g., .txt or .csv).

The user interface screen 300 may also include one or more selections to allow a user to filter, or otherwise limit, the results provided by the scheduler. For example, the user interface screen may include a selection 332 for specifying a desired time of day for scheduling the outage window, a selection 334 for specifying a desired duration of the desired outage window, and/or a selection 336 for specifying a desired day of the week for scheduling the outage window. In some cases, the user interface screen 300 may provide the user a selection 338 for specifying a maximum number of future time windows to be displayed for any particular day. The selection 344 may provide the user a way to further limit the amount of future time windows to be displayed. For example, the selection 344 may allow a user to specify a maximum allowed risk tier, such as tier 4, such that only future time windows having a risk tier of tier 4 or less may be displayed with the results provided by the scheduler 110. In some cases, the field 342 may allow a user to specify an amount of historical performance data that may be used by the scheduler 110 in predicting the one or more future time windows. For example, the user may enter a duration (e.g., a number of days between, or including, about 14 days and about 120 days) specifying the number of days of historical performance data from the data store 140 to be used by the scheduler 110.

In some cases, the user information screen may include a section 320 where a user may provide the scheduler 110 information about how to present the resulting future time windows to the user. For example, the section 320 may include a field 322 for a user to specify a number of future time windows to be output by the scheduler. The display button 324, or other similar button, may be used to trigger the prediction of the desired number of future time windows by the scheduler 110. In some cases, the section 320 may include a filter selection field 326. The filter selection field 326 may allow a user filter the results provided by the scheduler 110, such as by using the filters 118, or to display all the possible future time windows. In many cases, user interface 130 may be configured to display the future time windows predicted by the scheduler using a screen, such as the screens 400 500 of FIGS. 4 and 5. Each future time window may be displayed including a day of the week, a start time for the time window, a duration of the time window, and a confidence level associated with each time window. The results may be provided as a list, in a table, in a graphic, or the like. In some cases, a user may desire to export the results to a file using the export button 328. In some cases, the user may desire to email, or otherwise send (e.g., a text message or an instant message) to one or more recipients using the email button. The functionality of the export button 328 and the email button 329 may be combined using another export dialog window (not shown), but this is not required.

Figure 4:
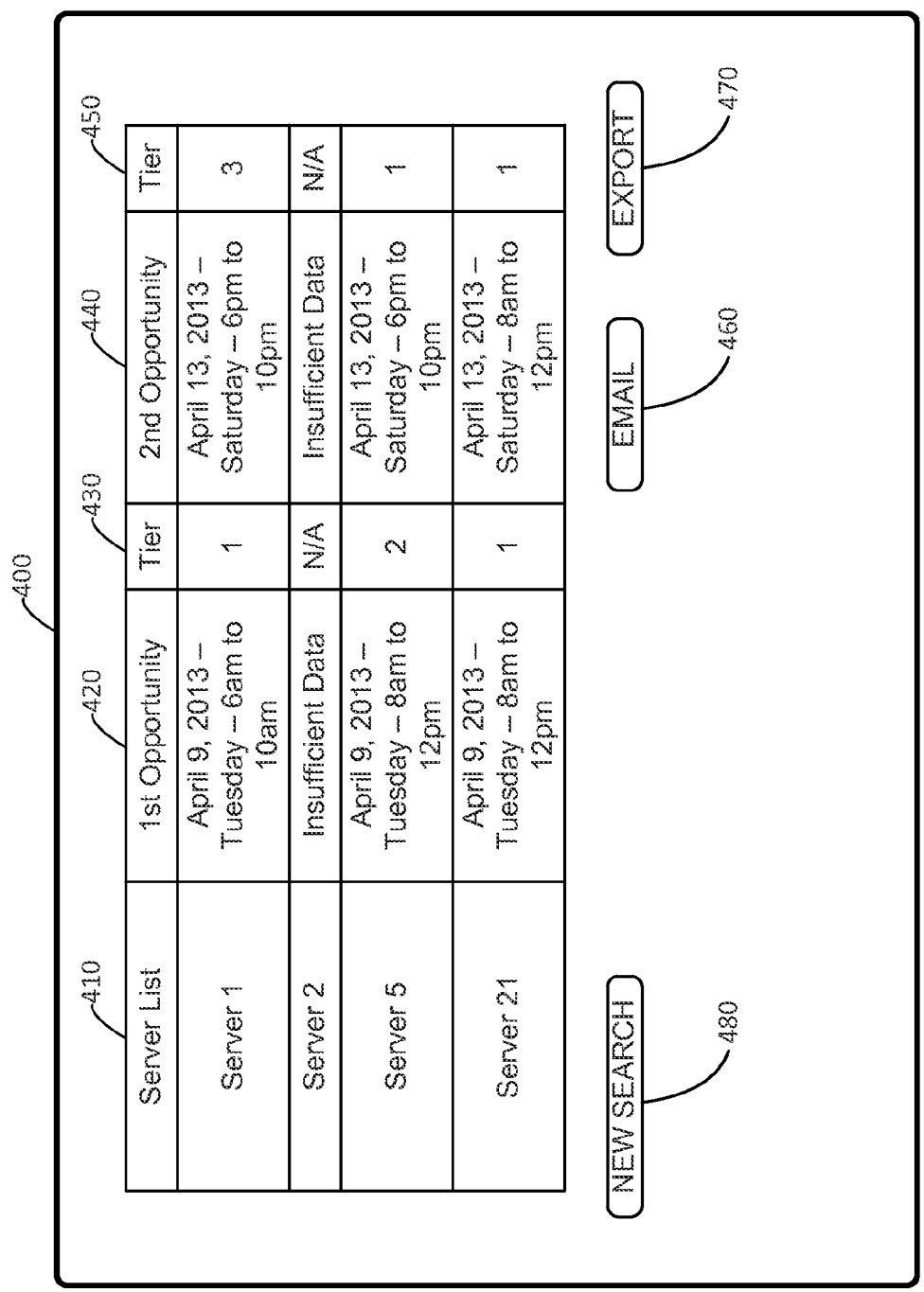
FIG. 4 shows an illustrative graphical user interface screen for presenting one or more future outage windows according to one or more aspects as described herein, and that may be used, for example, to perform work on one or more servers.

FIG. 4 shows an illustrative user interface screen 400 for presenting one or more future outage windows that that may be used to perform work on a server 126 according to one or more aspects as described herein. For example, the user interface screen 400 may be used to display at least a portion of the future time windows predicted by the scheduler 110. In this illustrative example, the user interface screen 400 may include a first column 410 for displaying a list of servers, a second column 420 for listing a first candidate future time window that may be used as an outage window for a particular server of column 410. The third column 430 may be used to display a confidence level (e.g., tier level) associated with the first candidate future time window of the second column 420. A fourth column 440 may be included in the user interface screen 400 for listing a second candidate future time window that may be used as an outage window for a particular server of column 410. The fifth column 450 may list an associated confidence level (e.g. tier level) associated with each candidate future time window of column 440. In some cases, the data store 140 may not include enough historical performance data for a particular server (e.g., server 2). In such cases, the illustrative user interface screen 400 may display a message, such as "Insufficient Data", "N/A", or the like. The format shown for the user interface screen 400 is merely illustrative and is not meant to be limiting in any way. For example, another user interface screen 400 may be configured to graphically display one or more of the future time windows predicted by the scheduler 110 on a chart using colors, for example, to graphically indicate a confidence level, but this is not required.

In some cases, a button 480 may be provided to allow a user to trigger another search by the scheduler 110. In such cases, for example, the user interface 130 may display the user interface screen 300 of FIG. 3 to allow a user to enter and/or modify the desired search information. In some cases, the results of the search may be emailed and/or otherwise exported (e.g., saved as a file, sent in a text message, or sent in an instant message).

Figure 5:
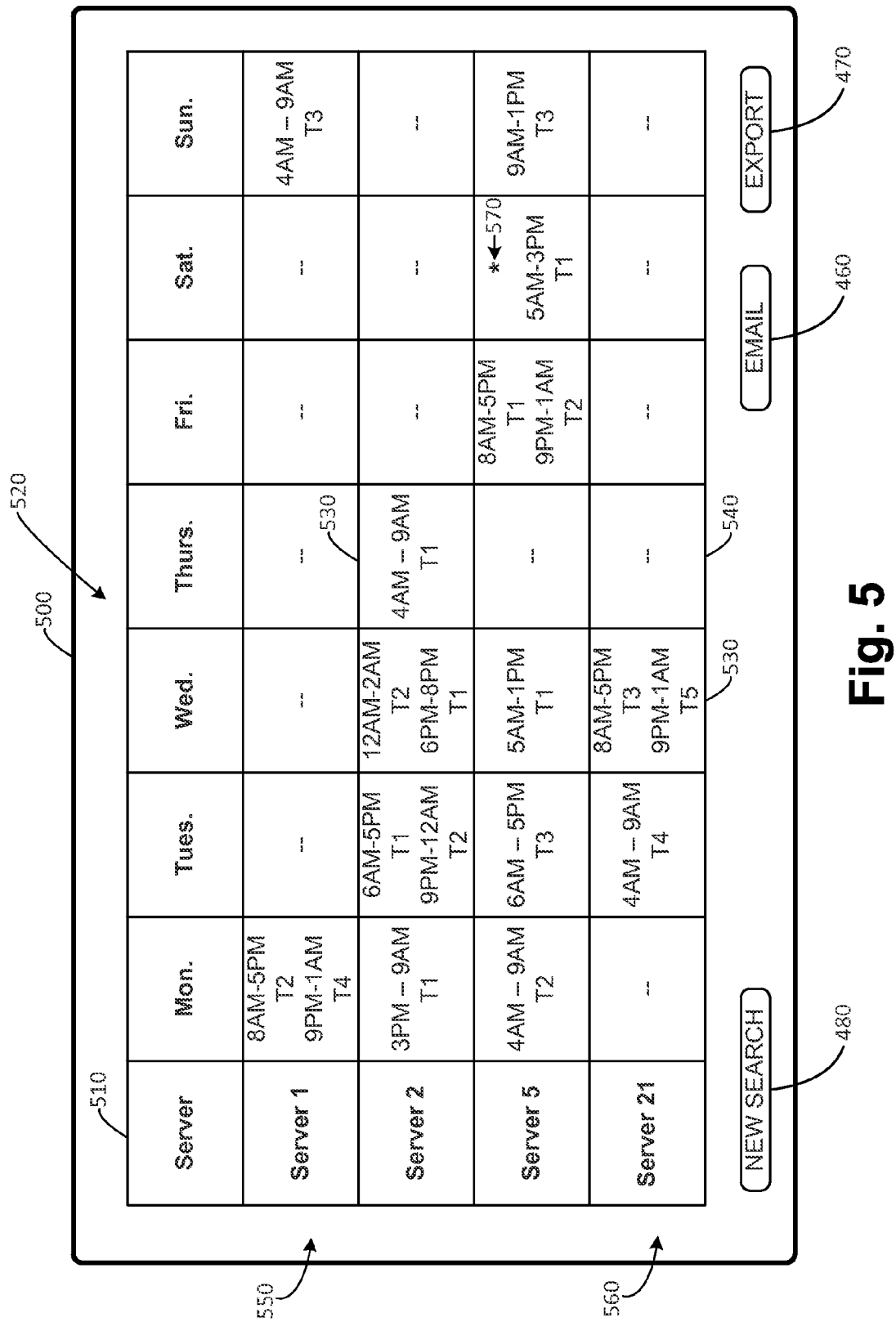
FIG. 5 shows an illustrative graphical user interface screen for presenting one or more future outage windows according to one or more aspects as described herein, and that may be used, for example, to perform work on one or more servers.

FIG. 5 shows an illustrative user interface screen 500 for presenting one or more future outage windows that that may be used to perform work on one or more of the servers 125 according to one or more aspects as described herein. For example, this illustrative user interface screen 500 may be capable of providing results from the scheduler 110 that may have been filtered, as described above. For example, the user interface screen 500 may include a first column 510 for displaying the list of servers for which the scheduler 110 predicted one or more candidate future time windows for use as an outage window. A number of columns 520 may be configured to display information (e.g., a start time, a duration, and/or a confidence level) about one or more future time windows predicted for one or more days of the week. For example, one or more cells 530 may be used to display one or more candidate future time windows for use as the outage window for the associated server. In some cases, the cell 540 will display an indication that a future time window was not available for that day or was filtered from the displayed results. For example, in row 550, a user may have specified that only results having a confidence level under tier 4 were to be displayed. In another example, the column 560 may be associated with a search, where the only resulting candidate future time windows were found for Tuesday and Wednesday and where the confidence levels for these future time windows ranged from tier 3 to tier 5. In some cases, the user interface screen 500 may include an indication (e.g., asterisk 570) of whether another outage window is, or may have been, previously scheduled during at least a portion of the listed future time window. Of course, the user interface screen 500 is meant to be illustrative and other formats and/or configurations may be contemplated.

Figure 6:
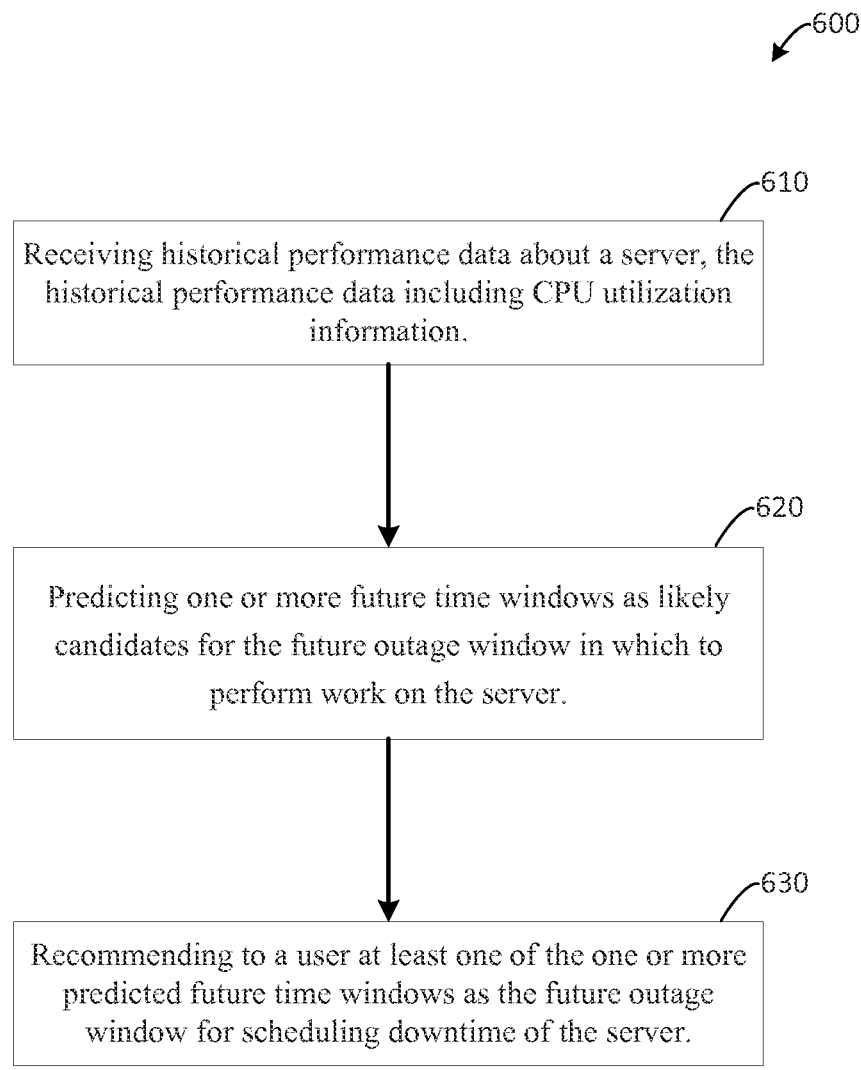
FIG. 6 is a flow chart of an illustrative technique for determining one or more future outage windows according to one or more aspects as described herein.

FIG. 6 is a flow chart of an illustrative method 600 for determining one or more future outage windows defining when work may be performed on a server according to one or more aspects as described herein. For example, the illustrative method 600 may be used to schedule downtime of one or more servers 125 on a network, such as the target computer system 120. At step 610, the scheduler 110, for example, may receive historical and/or current performance data about at least one server 126, where the historical performance data may include, for instance, historical and/or current CPU utilization information about the operation of the at least one server 125. The performance data may be received from one or more data stores, such as the data store 140. At step 620, the scheduler 110 (for example) may predict one or more future time windows as likely candidates for the future outage window in which to perform work on the at least one server 126. As discussed above, the scheduler 110 may predict the one or more future time windows using one or more statistical methods, filters, and/or algorithms. At step 630, the scheduler 110 (for example) may make a recommendation, to a user, of at least one of the one or more predicted future time windows for selection by the user as the future outage window.

In some cases, the scheduler 110 may be further configured to determine one or more historical time windows associated with CPU utilization of the server based, at least in part, on the historical performance data. One or more of the determined historical time windows may be used when predicting the one or more predicted future time windows. In some cases, when determining the one or more historical time windows, the scheduler may be configured to determine a baseline CPU utilization level for the at least one server 126.

In some cases, the scheduler 110 may be further configured to associate a confidence level (e.g., a risk tier) with each of the one or more predicted future time windows. For example, the future time windows may correspond to predicted durations of low CPU utilization. The confidence levels associated with each of the future time windows may correspond to a risk associated with scheduling downtime during the particular duration. The future outage window may be determined, at least in part, using the confidence level associated to the one or more predicted future time windows. In some cases, the scheduler 110 may further be configured to compare a historical CPU utilization level during the one or more historical time windows to one or more CPU utilization thresholds when determining the confidence level associated with each of the predicted future time windows. For example, as discussed above, the CPU utilization thresholds may range between about 1% CPU utilization to about 10% CPU utilization. In some cases, as discussed above, the technique 600 may include filtering the future time windows provided by the scheduler when providing the results to the user. For example, the scheduler may be configured to use one or more filters 118, such as the "smart filter", as described above. The technique 600 shown in FIG. 6 is meant to be illustrative, and other similar techniques may be contemplated.

Although illustrative embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:
1. An apparatus, comprising:
    an input configured to receive information about at least one server;
    a non-transitory memory storing computer-executable instructions;
    a processor communicatively coupled to the input and the memory, the processor configured to execute the com- puter-executable instructions, wherein execution of the instructions would cause the processor to:

analyze the information associated with the at least one server to identify one or more historical time windows corresponding to low utilization of the at least one server, the historical time windows corresponding to low utilization being identified by comparing values of a plurality of processor utilization parameters to baseline values of the processor utilization parameters, the plurality of processor utilization parameters including at least: a CPU user utilization including a percentage of users utilizing one or more applications on a particular server, and a CPU utilization, the baseline values being based, at least in part, on an age of the at least one server; and predict, using at least the historical time windows, one or more future time windows corresponding to low utilization of the at least one server;

recommend, via a user interface, one or more of the future time windows for use as an outage window in which to perform work on the one or more servers, wherein each of the one or more future time windows is associated with a risk tier that corresponds to a risk of scheduling an outage of the one or more servers during each of the one or more future time windows, and the recommending includes filtering the one or more future time windows to display, via the user interface, only future time windows having a risk tier meeting a predetermined threshold; and receive, via a user input of the user interface screen, a selection of one or more of the future time windows for use as the future outage window.

2. The apparatus of claim 1, wherein execution of the instructions would further cause the processor to determine the risk tier associated with each of the one or more future time windows.

3. The apparatus of claim 2, wherein the risk tier corresponds to a utilization level of the same server during one or more similar historical time windows.

4. The apparatus of claim 3, wherein the risk tier corresponds to whether the utilization level of the at least one server during one or more similar historical time windows is less than or equal to a specified threshold and/or a count of similar historical time windows having a utilization level of the at least one server less than or equal to the specified threshold.

5. The apparatus of claim 1, wherein the user interface is further configured to receive information about the at least one server and/or for presenting information about the one or more future time windows.

6. The apparatus of claim 5, wherein the user interface is displayed on a device separate from the apparatus and the device is configured to communicate with the apparatus via the Internet.

7. The apparatus of claim 5, wherein the user interface is further configured to facilitate entry of one or more conditions used when predicting the one or more future time window, wherein the one or more conditions include at least one of a time of day, a window duration, a day of the week, a maximum number of windows per day, and a maximum allowed confidence level.

8. The apparatus of claim 1, wherein the information received at the input includes historical operational information about one or more servers on a network and/or other server characteristics including an age of the server, a processor and one or more characteristics of the processor and/or memory.

9. The apparatus of claim 8, wherein the historical operational information includes historical processor utilization information for a specified time period.

10. The apparatus of claim 8, wherein the historical operational information is collected by a performance monitoring tool.

11. The apparatus of claim 8, wherein the user interface is further configured for specifying a number of days of historical information to be analyzed when predicting the one or more future time windows.

12. The apparatus of claim 11, wherein the number of days of historical information to be used is between 14 days of historical information to about 120 days of historical information.

13. A system comprising:

a first memory unit storing a database including historical processor utilization information about the operation of one or more servers on a network;

a scheduler coupled to the database, the scheduler including a second memory unit storing instructions and a processor, wherein execution of the instructions would cause the processor to:

analyze the processor utilization information associated with the one or more servers received from the database to identify one or more historical time windows corresponding to low utilization of the one or more servers, the historical time windows corresponding to low utilization being identified by comparing values of a plurality of processor utilization parameters to baseline values of the processor utilization parameters, the plurality of processor utilization parameters including at least: a CPU user utilization including a percentage of users utilizing one or more applications on a particular server, and a CPU utilization, the baseline values being based, at least in part, on an age of the at least one server;

predict, using at least the historical time windows, one or more future time windows corresponding to low utilization of the one or more servers;

determine a ranking associated with each of the one or more future time windows, wherein each ranking corresponds to a risk tier associated with scheduling an outage of the one or more servers during the associated future time window;

recommend, via a user interface and using the rankings, one or more of the future time windows for use as an outage window in which to perform work on the one or more servers, wherein each of the one or more future time windows is associated with a risk tier that corresponds to a risk of scheduling an outage of the one or more servers during each of the one or more future time windows, and the recommendation includes filtering the one or more future time windows to display, via the user interface, only future time windows having a ranking meeting a predetermined threshold; and receive, via a user input of the user interface screen, a selection of one or more of the future time windows for use as the future outage window.

14. The system of claim 13, further comprising the one or more servers on the network.

15. The system of claim 13, further comprising a performance analyzer for collecting historical performance data about the one or more servers, the performance data including the historical utilization information about the one or more servers.

16. A method comprising:
receiving, from a data store via a network, historical performance data about the utilization of a server;
analyzing, by a scheduler, the historical performance data about the utilization of the server to identify one or more historical time windows corresponding to low utilization of the server, the historical time windows corresponding to low utilization being identified by comparing values of a plurality of processor utilization parameters to baseline values of the processor utilization parameters, the plurality of processor utilization parameters including at least: a CPU user utilization including a percentage of users utilizing one or more applications on the server at a particular time, and a CPU utilization at a particular time, the baseline values being based, at least in part, on an age of the server;
predicting, by the scheduler, one or more future time windows of low utilization using the historical performance data;
determining, by the scheduler, a ranking associated with each of the one or more future time windows, wherein each ranking corresponds to a risk tier associated with scheduling an outage of the one or more servers during the associated future time window
recommending, via a user interface, at least one of the future time windows to be used as a future outage window of the server, wherein the recommending includes filtering the one or more future time windows to display only future time windows having a risk tier under a defined threshold; and
receiving, via a user input of the user interface screen, a selection of one or more of the future time windows for use as the future outage window.

17. The method of claim 16, wherein the one or more historical time windows are used for predicting the one or more future time windows.

18. The method of claim 17, further comprising comparing a utilization level of the server during the one or more historical time windows to one or more utilization thresholds, wherein the utilization thresholds correspond to utilization levels between about 1% utilization to about 10% utilization.

* * * * *